(12) United States Patent
Sun et al.

(10) Patent No.: US 11,157,178 B2
(45) Date of Patent: Oct. 26, 2021

(54) METHOD, DEVICE AND COMPUTER PROGRAM PRODUCT FOR DATA STREAM PROCESSING

(71) Applicant: EMC IP Holding Company LLC, Hopkinton, MA (US)

(72) Inventors: Ao Sun, Shanghai (CN); Jialei Wu, Shanghai (CN); Lu Lei, Shanghai (CN); Yu Teng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 16/394,863

(22) Filed: Apr. 25, 2019

(65) Prior Publication Data

US 2019/0384502 A1 Dec. 19, 2019

(30) Foreign Application Priority Data

Jun. 15, 2018 (CN) .......................... 201810623466.5

(51) Int. Cl.
*G06F 3/06* (2006.01)
*G06F 11/14* (2006.01)

(52) U.S. Cl.
CPC .......... *G06F 3/0611* (2013.01); *G06F 3/0655* (2013.01); *G06F 3/0673* (2013.01); *G06F 11/1469* (2013.01); *G06F 2201/84* (2013.01)

(58) Field of Classification Search
CPC .. G06F 3/0641; G06F 3/0608; G06F 11/1453; G06F 11/1469; G06F 2201/84
USPC .......................................................... 710/1
See application file for complete search history.

(56) References Cited

U.S. PATENT DOCUMENTS

| 8,010,503 B1* | 8/2011 | Chen ...................... G06F 16/10 707/679 |
| 2003/0140281 A1* | 7/2003 | Fu ........................ G06F 11/1492 714/38.13 |
| 2003/0158873 A1* | 8/2003 | Sawdon .................. G06F 16/10 |
| 2003/0229651 A1* | 12/2003 | Mizuno .............. G06F 11/1458 |
| 2008/0183973 A1* | 7/2008 | Aguilera ............ G06F 11/2094 711/147 |

(Continued)

OTHER PUBLICATIONS

P. Carbone et al., "Lightweight Asynchronous Snapshots for Distributed Dataflows," arXiv:1506.08603v1, Jun. 29, 2015, 8 pages.

*Primary Examiner* — Titus Wong
(74) *Attorney, Agent, or Firm* — Ryan, Mason & Lewis, LLP

(57) ABSTRACT

Embodiments of the present disclosure relate to a method, device and computer program product for data stream processing. The method comprises activating, in response to receiving a starting first predefined tag in a first input data stream from a first data source, a duplicate process of a process by duplicating a state of the process to the duplicate process. The method further comprises processing, by the duplicate process, only a data unit before an ending second predefined tag in a second input data stream from a second data source without interruption of processing of the first and second input data streams by the process. The second data source differs from the first data source. The method further comprises creating a snapshot of the duplicate process for recovery of the process due to failure in response to receiving the ending second predefined tag in the second input data stream.

20 Claims, 15 Drawing Sheets

(56) References Cited

U.S. PATENT DOCUMENTS

2008/0317246 A1* 12/2008 Manders ............ H04N 21/4385
  380/37
2010/0161557 A1* 6/2010 Anderson ............. G06F 16/174
  707/638
2011/0119234 A1* 5/2011 Schack ............... G06F 11/1435
  707/639

* cited by examiner

METHOD, DEVICE AND COMPUTER PROGRAM PRODUCT FOR DATA STREAM PROCESSING

RELATED APPLICATION(S)

The present application claims priority to Chinese Patent Application No. 201810623466.5, filed Jun. 15, 2018, and entitled "Method, Device and Computer Program Product for Data Stream Processing," which is incorporated by reference herein in its entirety.

FIELD

Embodiments of the present disclosure relate to storage systems, and more specifically, to a method, device and computer program product for data stream processing.

BACKGROUND

There is a new trend in the big data analytic world to use data stream processing instead of the traditional batch based data processing. As compared with the batch based data processing, data stream processing provides low latency in getting a result, and is able to handle an unbounded data set. During the data stream processing, it is important to ensure "exactly-once" processing of data units in the data stream to get an accurate processing result. In some application scenarios, it is demanded to have extremely low latency in getting a result all the time while maintaining the exactly-once property. However, currently available systems fail to satisfy this demand.

SUMMARY

Embodiments of the present disclosure provide a method, device and computer program product for data stream processing.

In a first aspect of the present disclosure, there is provided a method of processing data streams. The method comprises in response to receiving a starting first predefined tag in a first input data stream from a first data source, activating a duplicate process of a process by duplicating a state of the process to the duplicate process. The method further comprises processing, by the duplicate process, only a data unit before an ending second predefined tag in a second input data stream from a second data source without interruption of processing of the first and second input data streams by the process. The second data source differs from the first data source. The method further comprises in response to receiving the ending second predefined tag in the second input data stream, creating a snapshot of the duplicate process for recovery of the process due to failure.

In some embodiments, the processing of the first and second input data streams by the process comprises: generating a first output data unit based on a data unit in the first input data stream and a data unit in the second input data stream, the first output data unit comprising a flag bit, the flag bit being set to a first state to indicate that the first output data unit is generated by the process.

In some embodiments, processing, by the duplicate process, only the data unit before the ending second predefined tag comprises: generating a second output data unit based on the data unit before the ending second predefined tag, the second output data unit comprising the flag bit, the flag bit being set to a second state to indicate that the second output data unit is generated by the duplicate process.

In some embodiments, the method further comprises: adding in sequence the starting first predefined tag and the ending second predefined tag to an output data stream destined to a subsequent process of the process; and adding the first and second output data units between the starting first predefined tag and the ending second predefined tag.

In some embodiments, the method further comprises deactivating the duplicate process after creating the snapshot.

In a second aspect of the present disclosure, there is provided a method of processing data streams. The method comprises in response to receiving a starting first predefined tag in a data stream from a preceding process of a process, activating a duplicate process of the process by duplicating a state of the process to the duplicate process. The method further comprises determining whether a data unit in the data stream is to be processed by the process or by the duplicate process based on a state of a flag bit in the data unit. The method further comprises in response to receiving an ending second predefined tag in the data stream, creating a snapshot of the duplicate process of the process for recovery of the process due to failure.

In some embodiments, determining whether the data unit in the data stream is to be processed by the process or by the duplicate process based on the state of the flag bit in the data unit comprises: in response to detecting a first state of the flag bit, determining that the data unit is to be processed by the process, the first state indicating that the data unit is generated by the preceding process; and in response to detecting a second state of the flag bit, determining that the data unit is to be processed by the duplicate process, the second state indicating that the data unit is generated by a duplicate process of the preceding process.

In some embodiments, the method further comprises deactivating the duplicate process after creating the snapshot.

In a third aspect, there is provided an electronic device. The electronic device comprises at least one processor and at least one memory comprising computer program instructions. The at least one memory and the computer program instructions are configured to, together with the at least one processor, cause the device to perform steps comprising: in response to receiving a starting first predefined tag in a first input data stream from a first data source, activating a duplicate process of a process by duplicating a state of the process to the duplicate process; processing, by the duplicate process, only a data unit before an ending second predefined tag in a second input data stream from a second data source without interruption of processing of the first and second input data streams by the process, the second data source being different from the first data source; and in response to receiving the ending second predefined tag in the second input data stream, creating a snapshot of the duplicate process for recovery of the process due to failure.

In a fourth aspect, there is provided an electronic device. The electronic device comprises at least one processor and at least one memory comprising computer program instructions. The at least one memory and the computer program instructions are configured to, together with the at least one processor, cause the device to perform steps comprising: in response to receiving a starting first predefined tag in a data stream from a preceding process of a process, activating a duplicate process of the process by duplicating a state of the process to the duplicate process; determining whether a data unit in the data stream is to be processed by the process or by the duplicate process based on a state of a flag bit in the data unit; and in response to receiving an ending second predefined tag in the data stream, creating a snapshot of the duplicate process of the process for recovery of the process due to failure.

In a fifth aspect, there is provided a computer program product. The computer program product is tangibly stored on a non-transient computer readable medium and comprises machine executable instructions which, when executed, cause a machine to execute steps of the method according to the first aspect of the present disclosure.

In a sixth aspect, there is provided a computer program product. The computer program product is tangibly stored on a non-transient computer readable medium and comprises machine executable instructions which, when executed, cause a machine to execute steps of the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure in the accompanying drawings, the above and other objects, features and advantages of the present disclosure will become more apparent, wherein the same references generally refer to the same components in the embodiments of the present disclosure.

The same or similar reference numerals represent the same or similar components throughout the figures.

DETAILED DESCRIPTION

Example embodiments of the present disclosure will be described in more detail with reference to the accompanying drawings, in which the example embodiments of the present disclosure have been illustrated. However, it is to be understood the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "includes" and its variants are to be read as open terms that mean "includes, but is not limited to." The term "based on" is to be read as "based at least in part on." The terms "one example embodiment" and "one embodiment" are to be read as "at least one example." The term "another embodiment" is to be read as "at least one other embodiment." The terms "first," "second," and the like may refer to different or same objects. Other definitions, explicit and implicit, may be included below.

As used herein, the term "data stream" refers to an ordered sequence of data units. The ordered sequence may be an unbounded sequence of any multiple data units.

As used herein, the term "predefined tag" refers to a special data unit inserted into a data stream, and the process performs a predefined operation in response to receiving the special data unit.

As used herein, the term "subsequent process" refers to a procedure which starts after the completion of another process. A process which is completed previously is also referred to as "preceding procedure" of a process which is to be completed subsequently.

Currently, data stream processing is usually implemented using a distributed processing system. Since hardware used for data stream processing in the distributed processing system lacks absolute reliability, it is necessary to save a state of the distributed processing system during the process, so as to effect recovery due to failure. Currently, distributed snapshots are created in order to save the state of the distributed processing system.

Figure 1A:
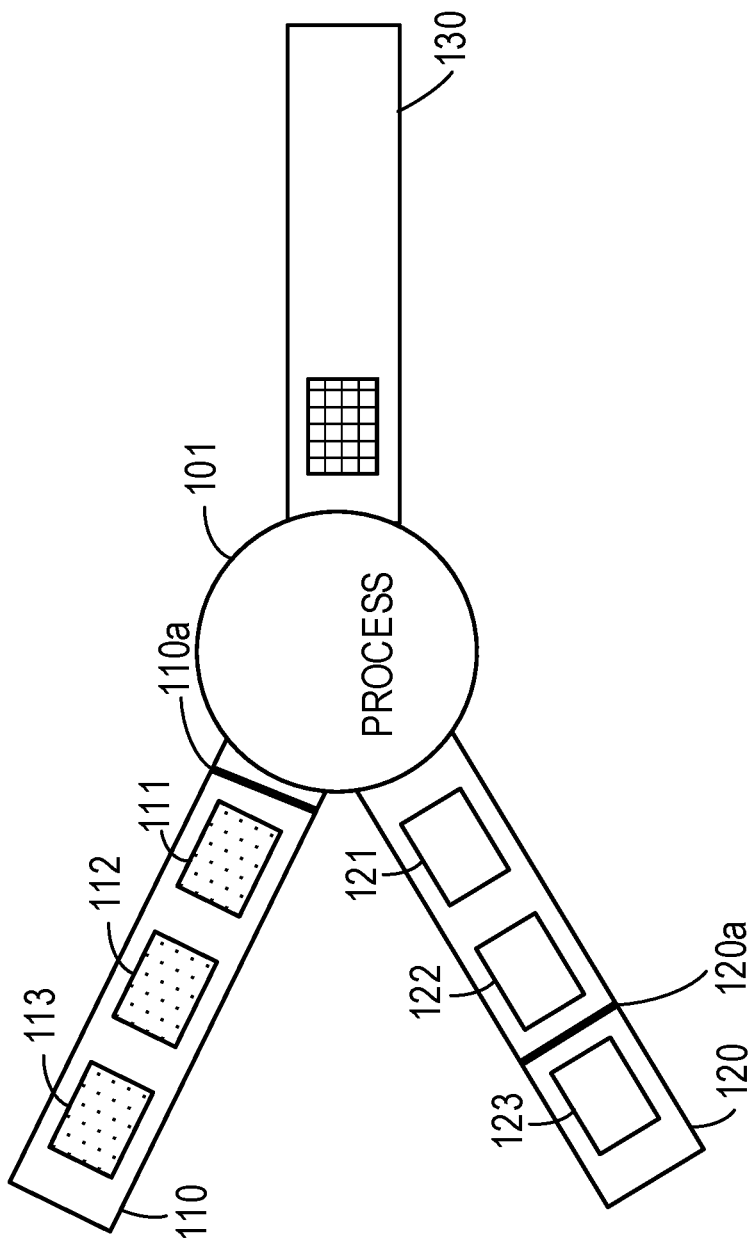
FIGS. 1A to 1C show schematic views of a procedure of creating a snapshot of a process in a traditional solution.
Figure 1B:
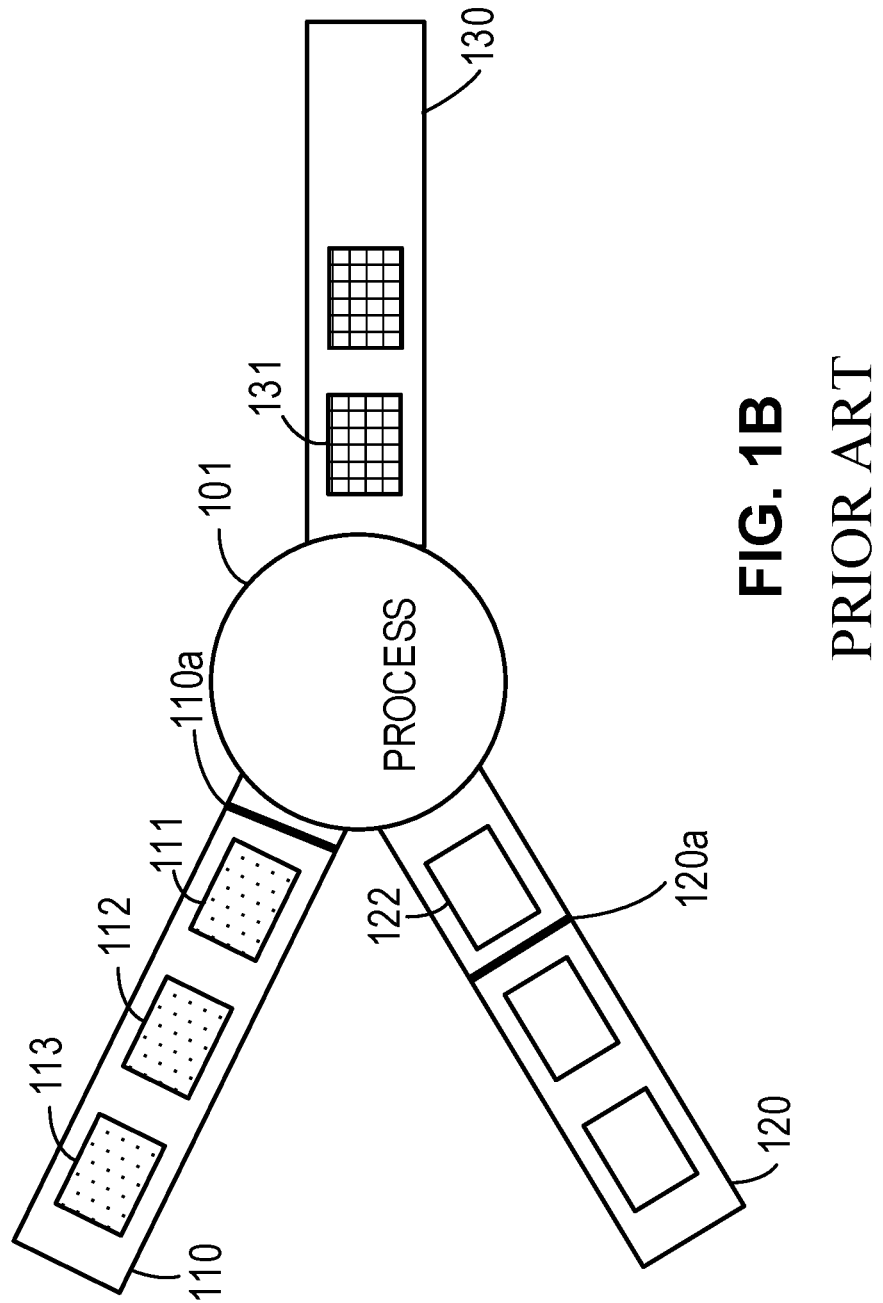
Figure 1C:
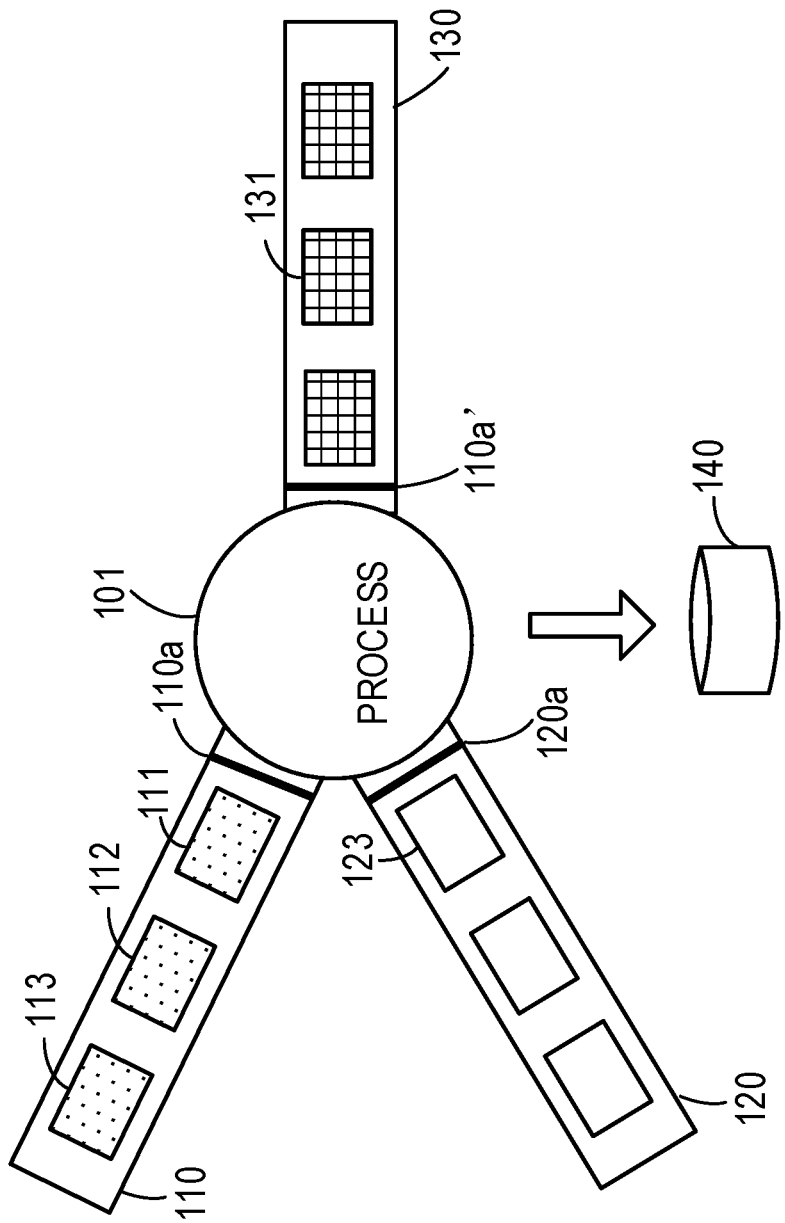

FIGS. 1A to 1C show schematic views of a procedure of creating a snapshot of a process in a traditional solution. As shown in FIG. 1A, a process 101 in a distributed processing system receives a first data stream 110 and a second data stream 120 from two different data sources respectively, processes the received data streams and outputs a data stream 130 to a subsequent process. The first data stream 110 comprises an ordered sequence of data units 111 to 113 and a snapshot tag 110a. The second data stream 120 comprises an ordered sequence of data units 121 to 123 and a snapshot tag 120a.

Since the data streams 110 and 120 are processed by the process 101 with different speeds, the snapshot tags 110a, 120a in the data streams 110 and 120 are received by the process 101 at different times. The process 101 first receives the snapshot tag 110a in the data stream 110. Then, the process 101 suspends the processing of the data units 111 to 113 that follow the snapshot tag 110a in the data stream 110, and continues to processing data units in the data stream 120 until the snapshot tag 120a in the data stream 120 is received. For example, as shown in FIG. 1B, the process 101 processes the data unit 121 in the data stream 120 to obtain a data unit 131, and outputs the data unit 131 in the data stream 130.

As shown in FIG. 1C, when the process 101 receives the snapshot tag 120a in the data stream 120, a snapshot of the process 101 is created, so that a state of the process 101 is saved in a persistent storage. The snapshot 140 may record position information of the data unit 111 in the data stream 110 and position information of the data unit 123 in the data stream 120.

In addition, after the process 101 receives the snapshot tag 110a in the data stream 110 as well as the snapshot tag 120a in the data stream 120, the process 101 will add a copy 110a' of one of the snapshots 110a and 120a to the data stream 130 outputted to the subsequent process, as shown in FIG. 1C. Thus, the subsequent process of the process 101 may create its own snapshot after receiving the snapshot tag 110a' in the data stream 130. In this way, each process in the distributed processing system may locally create its own snapshot, so that a consistent view of the whole processing may be periodically obtained. When any one process in the distributed processing system is restarted on failure, with snapshots of the processes, the states of the processes may be set to the states when the snapshots are created. Thus, the processes can continue the processing from data units (e.g., the data units 111 and 123) after the snapshot tags.

A synchronization procedure of input data streams refers to a procedure that the process 101 suspends the processing of an input data stream containing a snapshot tag after the snapshot tag is received, and then the process 101 creates a snapshot until snapshot tags in all input data streams are received. Although the synchronization procedure usually takes only several milliseconds, it is unacceptable to application scenarios that always require obtaining processing results with extremely low latency. In order to avoid latency caused by the synchronization procedure, there have been proposed solutions for snapshot creating without the synchronization procedure being executed, which will be described with reference to FIGS. 2A to 2C.

Figure 2A:
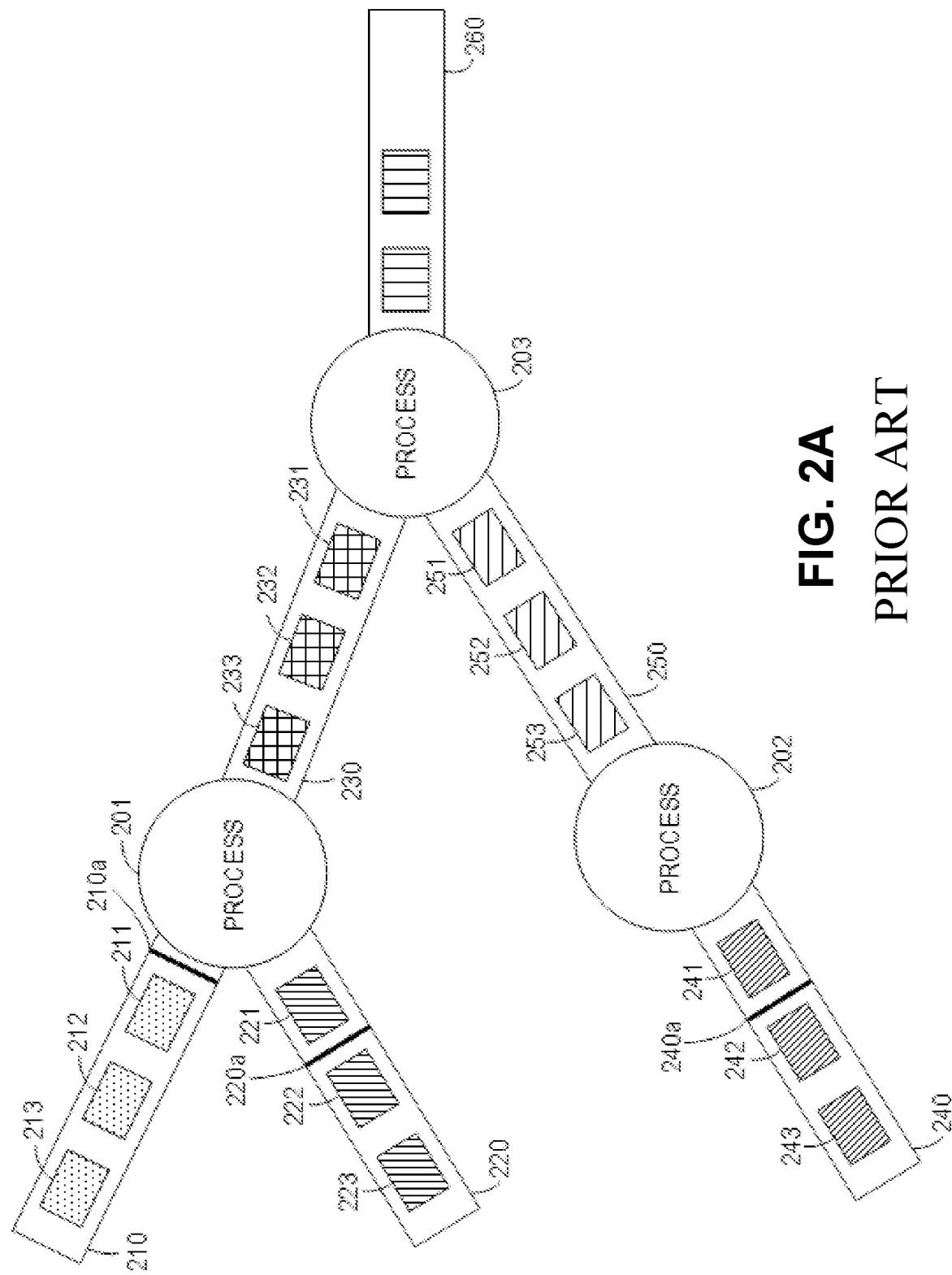
FIGS. 2A to 2C show schematic views of a procedure of creating a snapshot of a process in another traditional solution.

As shown in FIG. 2A, a process in a distributed processing system receives a first data stream 210 from a first data source and a second data stream 220 from a second data source. The first data source is different from the second data source. The first data stream 210 comprises an ordered sequence of data units 211 to 213 and a snapshot tag 210a. The second data stream 220 comprises an ordered sequence of data units 221 to 223 and a snapshot tag 220a. The process 201 processes the data streams 210 and 220 to obtain data units 231 to 233, adds the data units 231 to 233 to an output data stream 230 and then outputs the data stream 230 to a subsequent process 203.

A process 202 receives a third data stream 240 from a third data source. The third data source is different from the first data source and the second data source. The third data stream 240 comprises an ordered sequence of data units 241 to 243 and a snapshot tag 240a. The process 202 processes the received data stream 240 to obtain data units 251 to 253, adds the data units 251 to 253 to an output data stream 250 and then outputs the data stream 250 to the subsequent process 203.

The process 203 processes the received data streams 230 and 250, adds processing results to an output data stream 260 and then outputs the data stream 260 to a subsequent process (not shown).

Similar to the process 101 as shown in FIG. 1A, the process 201 receives snapshots in the data streams 210 and 220 at different times. As shown in FIG. 2A, the process 201 first receives the snapshot tag 210A in the data stream 210. Next, unlike the snapshot creating procedure as shown in FIGS. 1A to 1C, the process 201 does not suspend the processing of data units after the snapshot tag 210a in the data stream 210, but continues processing data units in the data stream 210 and data units in the data stream 220 so as to wait to receive the snapshot tag 220a in the data stream 220.

Figure 2B:
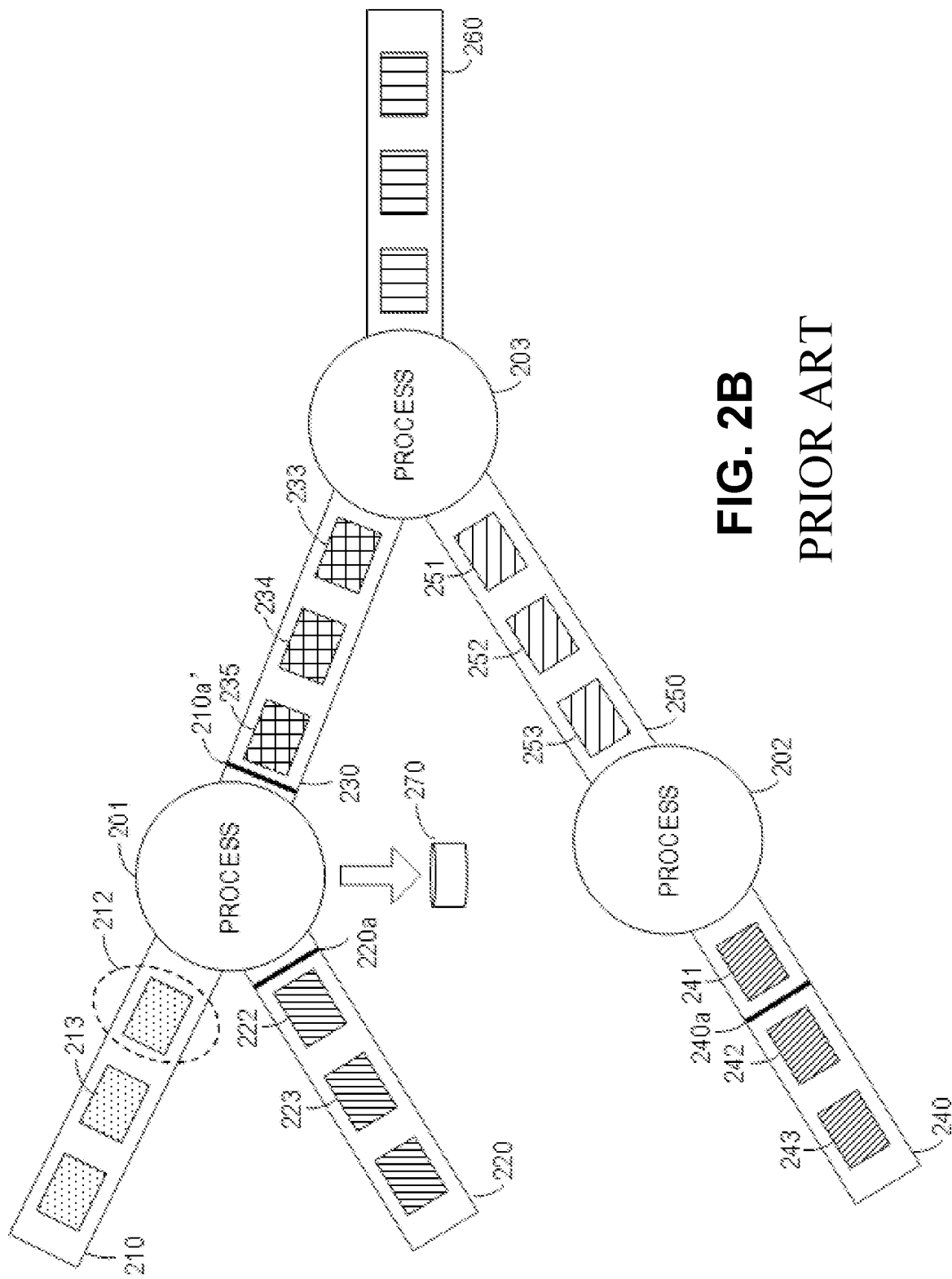

For example, as shown in FIG. 2B, the process 201 processes the data units after the snapshot tag 210a in the data stream 210 to obtain a data unit 234, processes the data unit 221 before the snapshot tag 220a in the data stream 220 to obtain a data unit 235, adds the data units 234 and 235 to the output data stream 230 and then outputs the data stream 230 to the subsequent process 203. In addition, the process 201 further adds a copy (i.e. a snapshot tag 210a') of the snapshot tag 210a to the output data stream 230.

When the process 201 receives the snapshot tag 220a in the data stream 220, a snapshot 270 of the process 201 is created. Thus, a state of the process 201 is saved to a persistent storage. The snapshot 270 may record position information of the data unit 212 in the data stream 210 and position information of the data unit 222 in the data stream 220. Thus, when any process is restarted on failure, a state from data sources to the process may be set using the snapshot of the process. Thus, the process may continue the processing from the data units 212 and 222.

Figure 2C:
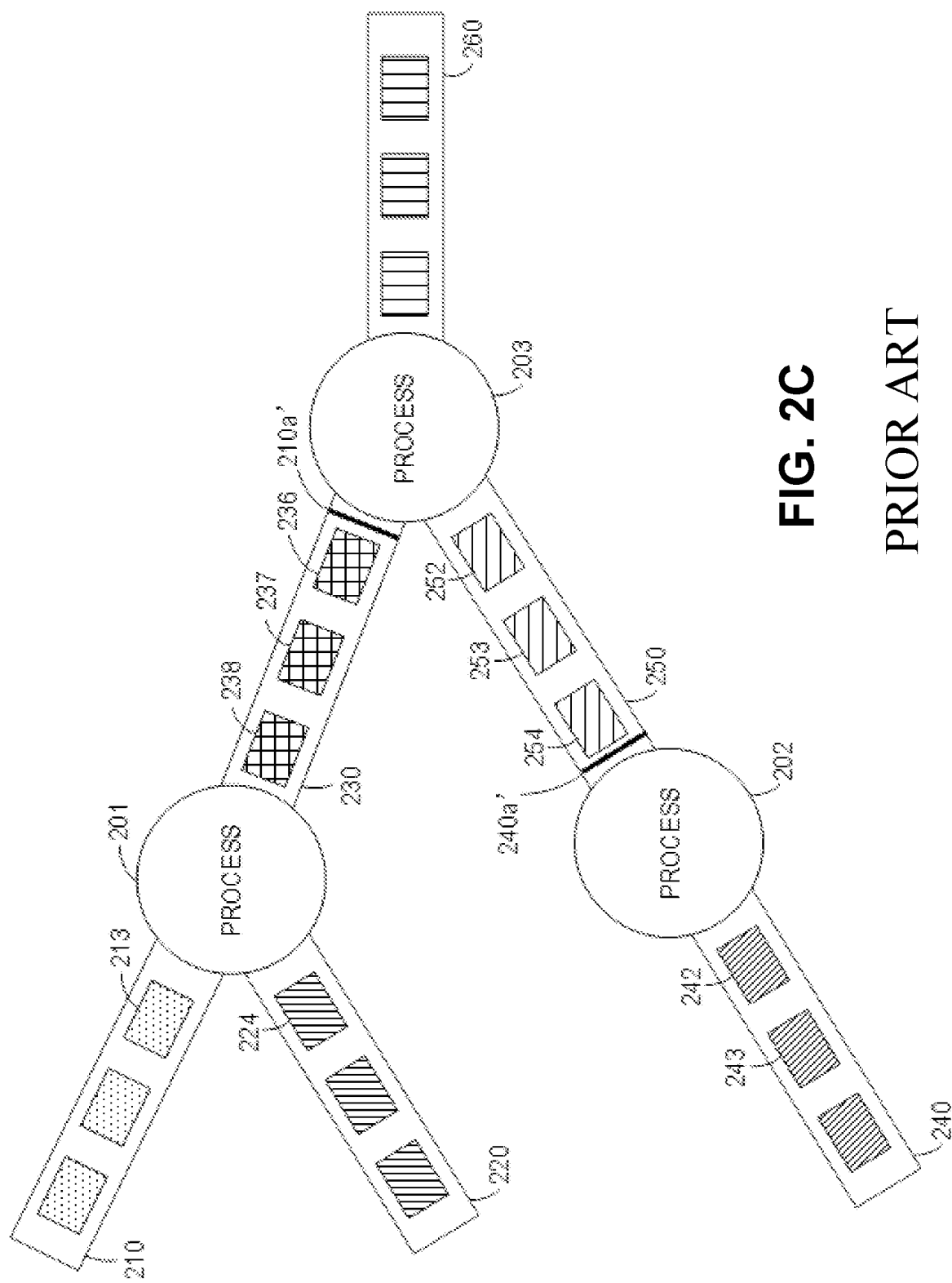

As shown in FIG. 2C, when the process 203 receives the snapshot tag 210a' in the data stream 230 but does not receive a snapshot tag 240a' in the data stream 250, like the process 201, the process 203 does not suspend the processing of data units 236 to 238 after the snapshot tag 210a' in the data stream 230, but continues processing the data units 236 to 238 in the data stream 230 and data units 252 to 254 in the data stream 250 so as to wait to receive a snapshot tag 240a' in the data stream 250.

The fact that the process 201 creates a snapshot without performing the synchronization procedure exerts no impact on the process 201 itself, but will affect the failure recovery procedure of its subsequent process 203. The process 201 is a predecessor process of the process 203, so its snapshot 270 already records the processing of data units before the data units 212 and 222. Therefore, when performing recovery of the process 203 due to failure, as long as the process 201 is made to continue the processing from the data units 212 and 222, the process 201 can output the data units 233 to 235 to the data stream 230 destined to the process 203. Thus, the processing of the process 203 may be recovered. However, the snapshot 270 does not record which data units in the data streams 210 and 220 are used for generating the data units 236 to 238 after the data unit 235. Therefore, while performing recovery of the process 203 due to failure, as long as the process 201 is made to continue the processing from the data units 212 and 222, the process 203 has to re-process the data units 236 to 238. Thus, the exactly-once processing property of data units in data streams is broken, and further the final processing result is wrong.

To at least partially solve the above and other potential problems, the embodiments of the present disclosure provide a solution for data stream processing. According to various example embodiments of the present disclosure, a pair including a trigger tag (also referred to as a first predefined tag) and a snapshot tag (also referred to as a second predefined tag) which are adjacent to each other is inserted into each input data stream from each data source. After a process receives a first trigger tag (also referred to as a starting trigger tag) in a first input data stream, a duplicate process of the process is activated by copying a state of the process to the duplicate process. The duplicate process only processes data units before an ending snapshot tag in a second input data stream, but the processing of the first input data stream and the second input data stream is not interrupted. A snapshot of the duplicate process which is created after receiving the ending snapshot tag from a second data source is used for recovery of the process due to failure.

Based on such a mechanism of data stream processing, the process does not interrupt the processing of the first input data stream and the second input data stream after receiving the starting trigger tag. Thus, the continuous processing of the data stream can be guaranteed and the data stream processing service can be provided with extremely low latency. The duplicate process only processes data units before the ending snapshot tag in the second input data stream, but does not process data units after the starting trigger tag in the first input data stream. Therefore, the snapshot of the duplicate process which is created after receiving the ending snapshot tag from the second data source can keep the semantics of the snapshot. Further, while performing failure recovery of the process by means of the snapshot of the duplicate process, it can be guaranteed that any data unit in the data stream is processed exactly once, and the final wrong processing result can be avoided. With reference to FIGS. 3 to 10, detailed descriptions are presented below to a method of processing data streams according to embodiments of the present disclosure.

Figure 3:
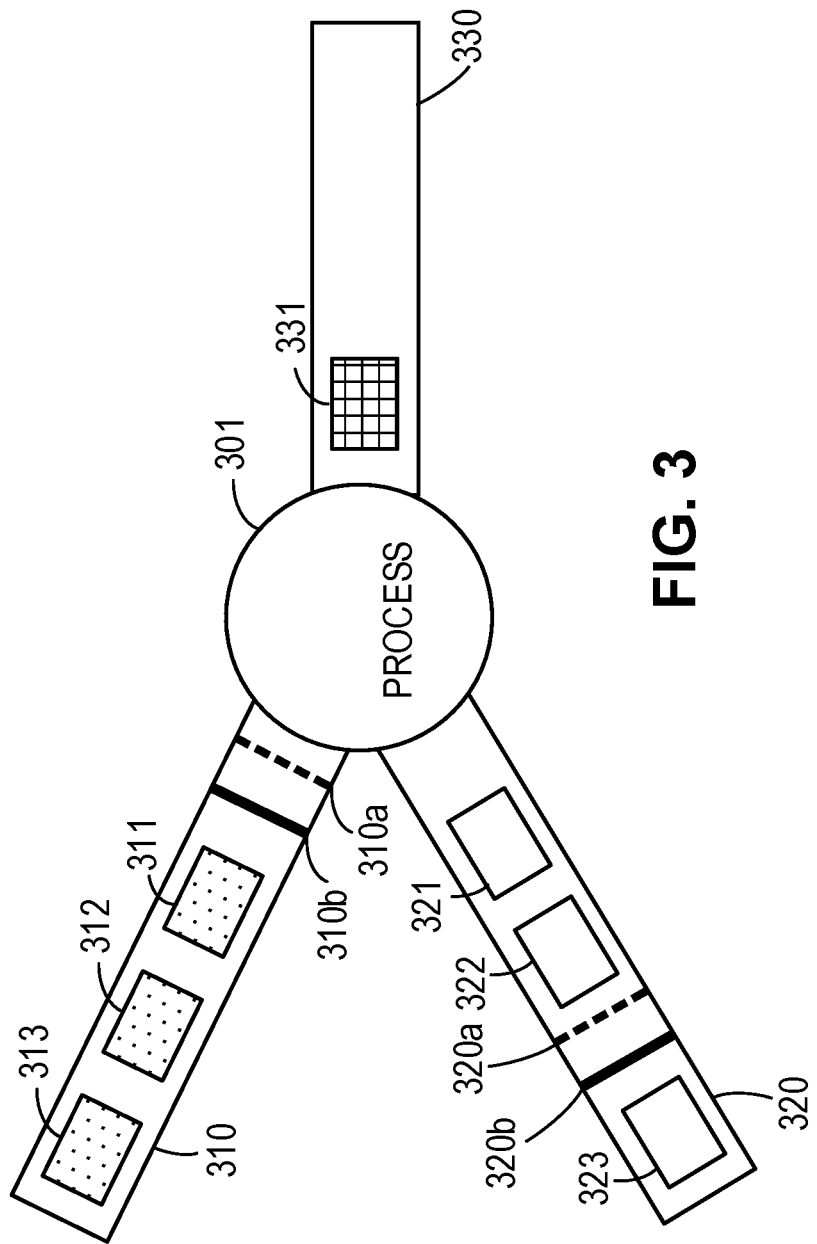
FIG. 3 shows a schematic view of data stream processing according to an embodiment of the present disclosure.

FIG. 3 shows a schematic view of data stream processing according to an embodiment of the present disclosure. As depicted, a process 301 receives a first input data stream 310 from a first data source and a second input data stream 320 from a second data source. The first data source is different from the second data source. As an example, the first input data stream 310 may comprise a temperature data stream, and the second data stream 320 may comprise a humidity data stream. Of course, this is merely an example, and according to a concrete application scenario, the first input data stream 310 and the second input data stream 320 may comprise any appropriate data stream to be processed.

The first input data stream 310 comprises an ordered sequence of data units 311 to 313, a trigger tag 310a and a snapshot tag 310b. The trigger tag 310a is closely adjacent to the snapshot tag 310b and precedes the snapshot tag 310b. The process 301 processes the received data streams 310 and 320 to obtain a data unit 331, adds the data unit 331 to an output data stream 330, and outputs the data stream 330 to a subsequent process (not shown).

It is to be understood although as shown in FIG. 3, the process 301 processes input data streams from two data sources, this is merely an example and it is not intended to limit the scope of the embodiments of the present disclosure in any manner. In other embodiments, the process 301 may process data streams from any appropriate number of data sources.

In some embodiments, the process 301 may be executed on a computing device in a computing device cluster. In other embodiments, the process 301 may be executed in a cloud environment. Alternatively, or additionally, the process 301 may be implemented partially or completely based on hardware, e.g. implemented based on a field programmable gate array (FPGA). The scope of the present disclosure is not limited in this regard.

For example, the first data source and the second data source may be sampled at different times or the process 301 may process the data streams 310 and 320 with different speeds. Thus, the time when the process 301 receives a trigger tag and a snapshot tag in the data stream 310 differs from the time when the process 301 receives a trigger tag and a snapshot tag in the data stream 320. As shown in FIG. 3, the process 301 first receives the trigger tag 310a and the snapshot tag 310b in the data stream 310, and then receives the trigger tag 320a and the snapshot tag 320b in the data stream 320. For the sake of discussion, the first trigger tag (e.g. the trigger tag 310a) among multiple trigger tags received by the process 301 is referred to as a "starting trigger tag" and the last snapshot tag (e.g. the snapshot tag 320b) among multiple snapshot tags received by the process 301 is referred to as an "ending snapshot tag".

In some embodiments, a first counter and a second counter may be provided to count the respective numbers of received trigger tags and snapshot tags, so as to determine the starting trigger tag among multiple trigger tags and the ending snapshot tag among multiple snapshot tags.

The starting trigger tag indicates the process 301 to activate a duplicate process of the process 301 by copying a state of the process 301 to the duplicate process. The ending snapshot tag indicates the process 301 to create a snapshot of the duplicate process for recovery of the process 301 due to failure. After receiving a trigger tag other than the starting trigger tag and a snapshot tag other than the ending snapshot tag, the process 301 does not perform corresponding operations, so these trigger tags and snapshot tags may be discarded.

Figure 4:
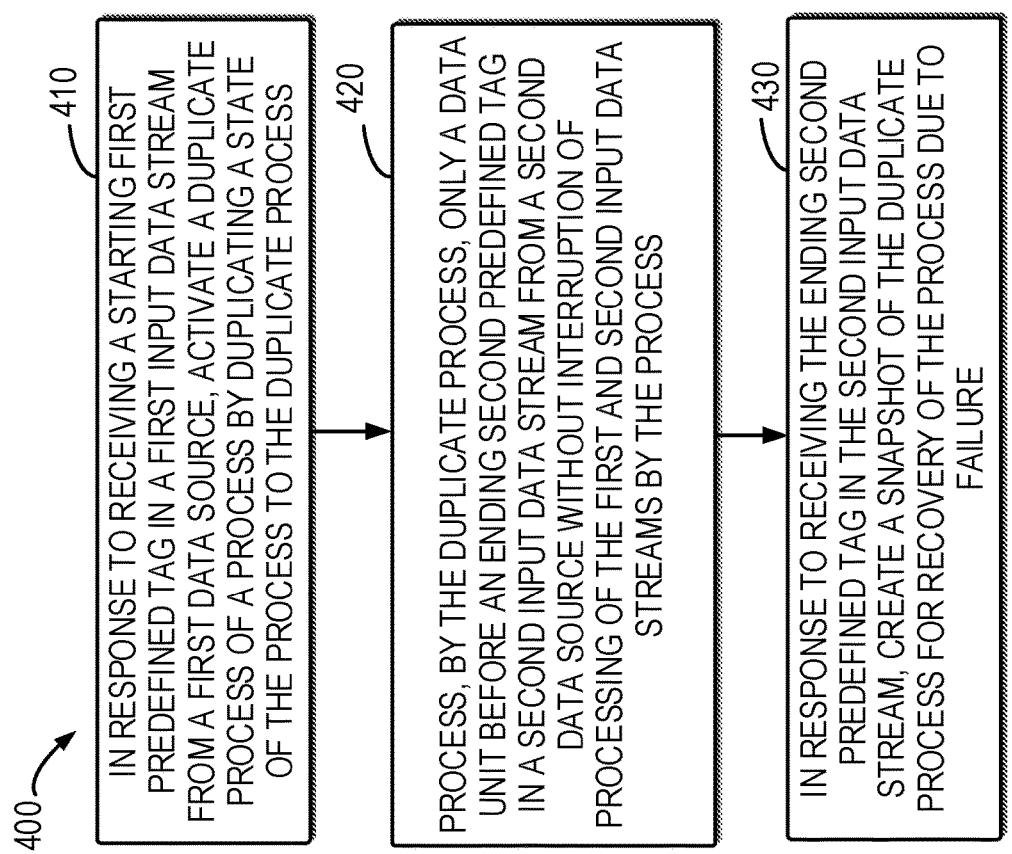
FIG. 4 shows a flowchart of a method of processing data streams according to an embodiment of the present disclosure.

FIG. 4 shows a flowchart of a method 400 of data stream processing according to some embodiments of the present disclosure. FIGS. 5 to 8 each show a schematic view of data stream processing according to embodiments of the present disclosure. In some embodiments, the method 400 may be implemented by the process 301 in FIG. 3. It is to be understood that the method 300 may further comprise an additional step that is not shown and/or omit a step that has been shown, and the scope of the present disclosure is not limited in this regard. For the sake of discussion, the method 400 is discussed in conjunction with FIGS. 3 and 5 to 8.

At 410, after receiving a starting trigger tag (e.g. the trigger tag 310a) in a first input data stream 310 from a first data source, the process 301 activates a duplicate process of the process 301 by duplicating a state of the process 301 to the duplicate process.

Figure 5:
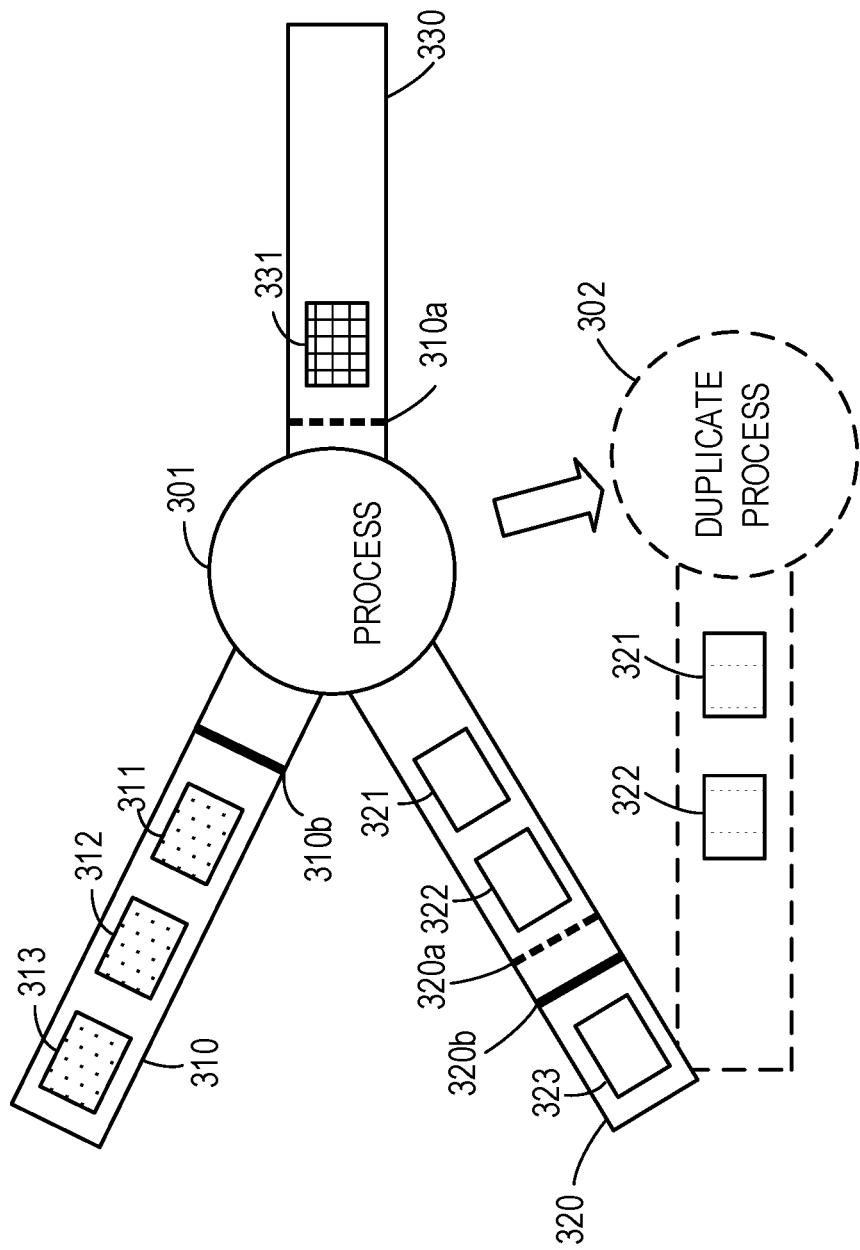
FIG. 5 shows a schematic view of activating a duplicate process in data stream processing according to an embodiment of the present disclosure.
Figure 6:
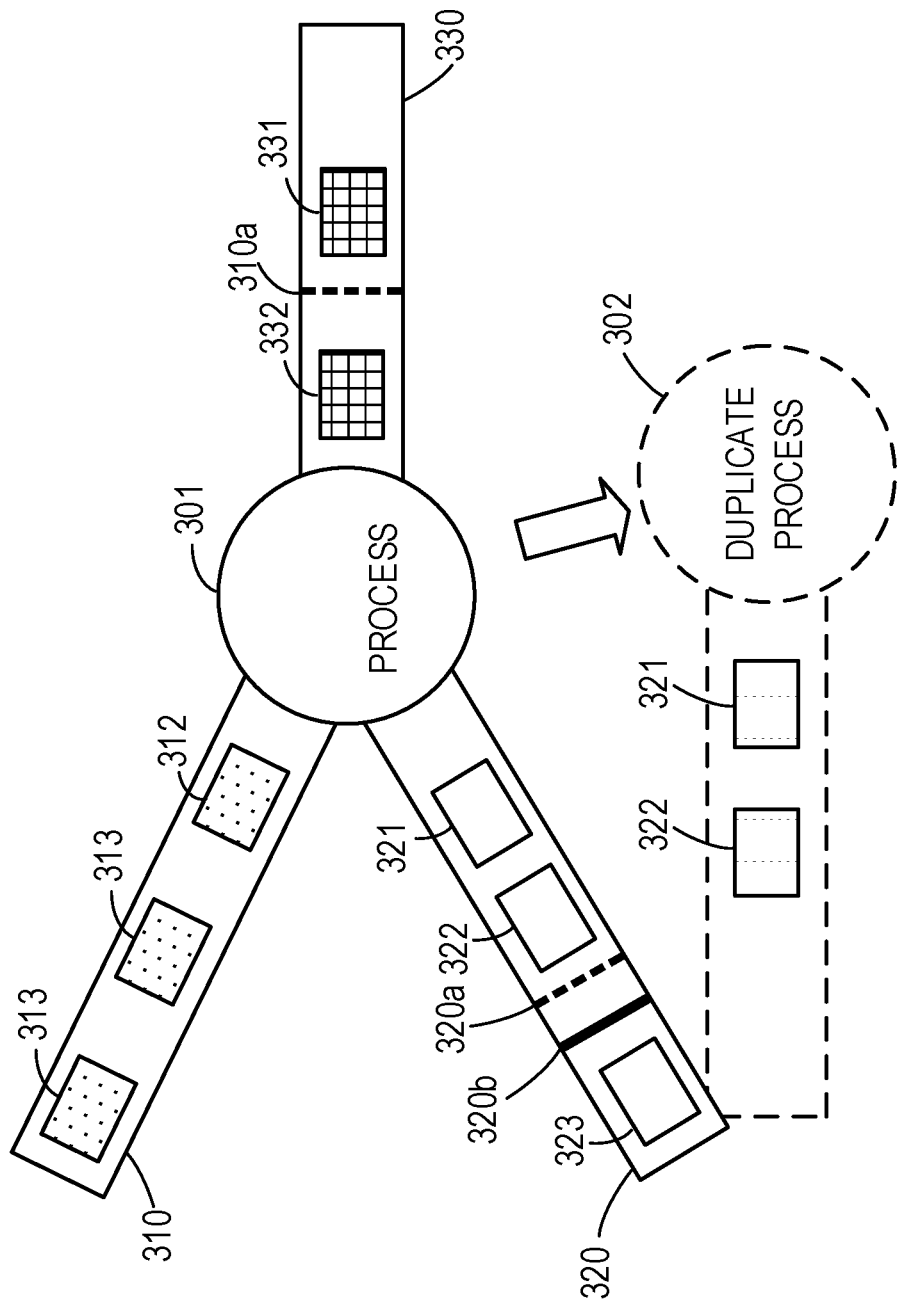
FIG. 6 shows a schematic view of processing of a process and a duplicate process in data stream processing according to an embodiment of the present disclosure.
Figure 7:
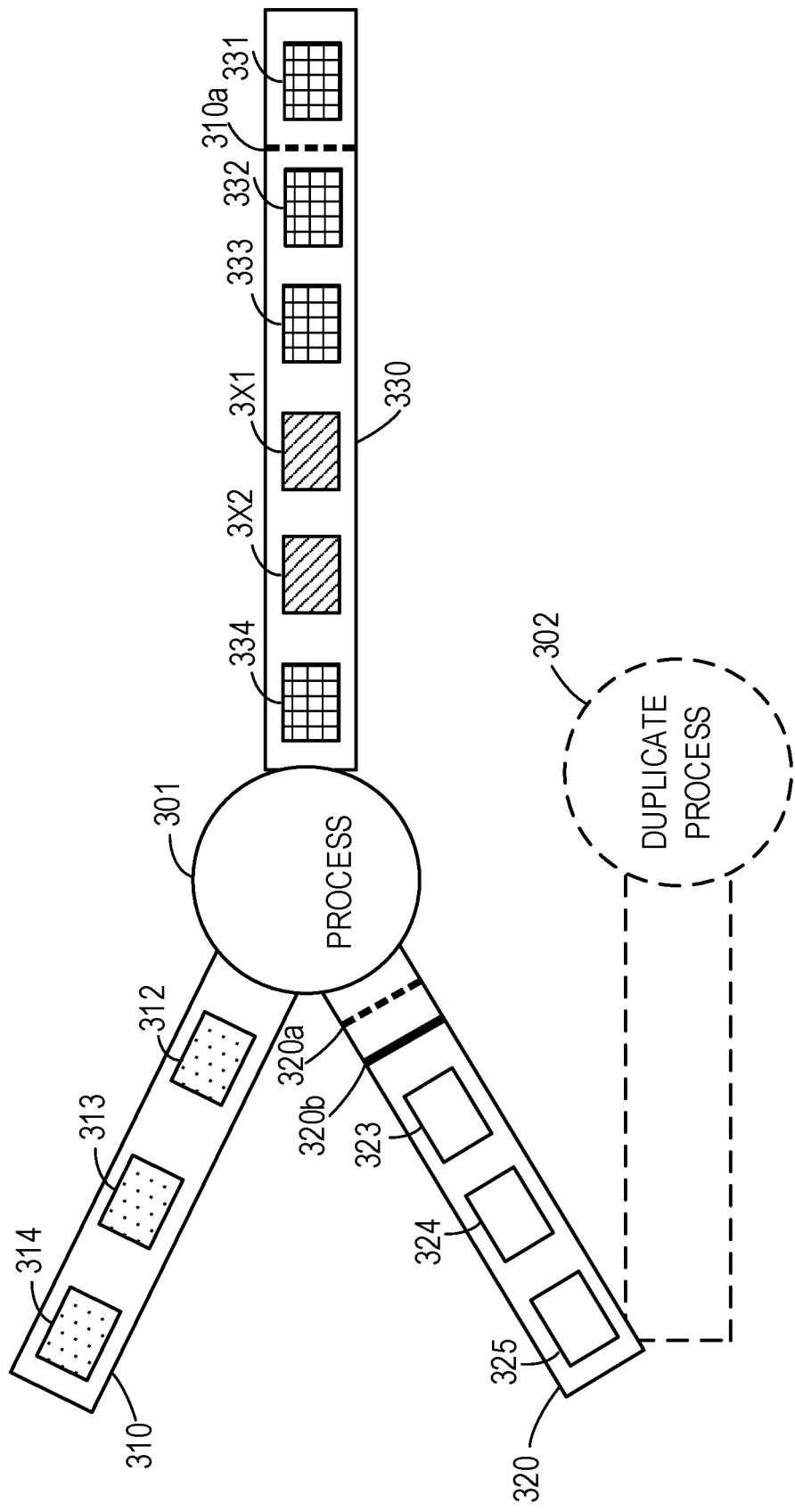
FIG. 7 shows a schematic view of processing of a process and a duplicate process in data stream processing according to an embodiment of the present disclosure.

For example, with reference to FIG. 5, the process 301 activates a duplicate process 302 of the process 301 by duplicating a state of the process 301 to the duplicate process 302. In the example in FIG. 5, the processing state of the process 301 is that data units before the trigger tag 310a in the first input data stream 310 and data units before the data unit 321 in the second input data stream 320 have been processed, and the activated duplicate process 302 also has this processing state. However, it is to be understood since the process 301 and the duplicate process 302 process different data units afterwards, their states differ from each other.

In some embodiments, after receiving the starting trigger tag 310a, the process 301 may add the starting trigger tag 310a to an output data stream destined to a subsequent process, so that the subsequent process may activate its own duplicate process after receiving the starting trigger tag 310a, which will be described with reference to FIGS. 9 and 10 below.

Still with reference to FIG. 4, at 420, the duplicate process 302 only processes data units before the ending snapshot tag 320b in the second input data stream 320, without interruption of processing of the first input data stream 310 and the second input data stream 320 by the process 301.

The process 301 continues processing data units after the starting trigger tag 310a in the first input data stream 310. For example, with reference to FIG. 6, the process 301 generates an output data unit 332 based on the data unit 311 after the starting trigger tag 310a, and adds the output data unit 332 to the output data stream 330 destined to the subsequent process.

In addition, the process 301 continues processing the second input data stream 320. For example, with reference to FIG. 7, the process 301 generates data units 333 and 334 based on the data units 321 and 322 before the ending snapshot tag 320b in the second input data stream 320, and adds the output data units 333 and 334 to the output data stream 330 destined to the subsequent process.

Since the process 301 does not interrupt the processing of the first input data stream 310 and the second input data stream 320 after receiving the starting trigger tag 310a, continuous processing of data streams can be guaranteed, and the data stream processing service can be provided with extremely low latency.

The duplicate process 302 does not process the first input data stream 310, but only processes data units before the ending snapshot tag 320b in the second input data stream 320. For example, with reference to FIG. 7, the duplicate process 302 generates output data units 3X1 and 3X2 based on the data units 321 and 322 before the ending snapshot tag 320b, and adds the output data units 3X1 and 3X2 to the output data stream 330 destined to the subsequent process.

Returning to FIG. 4, at 430, after receiving the ending snapshot tag 320b in the second input data stream 320, the process 301 creates a snapshot of the duplicate process 302 for recovery of the process 301 due to failure.

Figure 8:
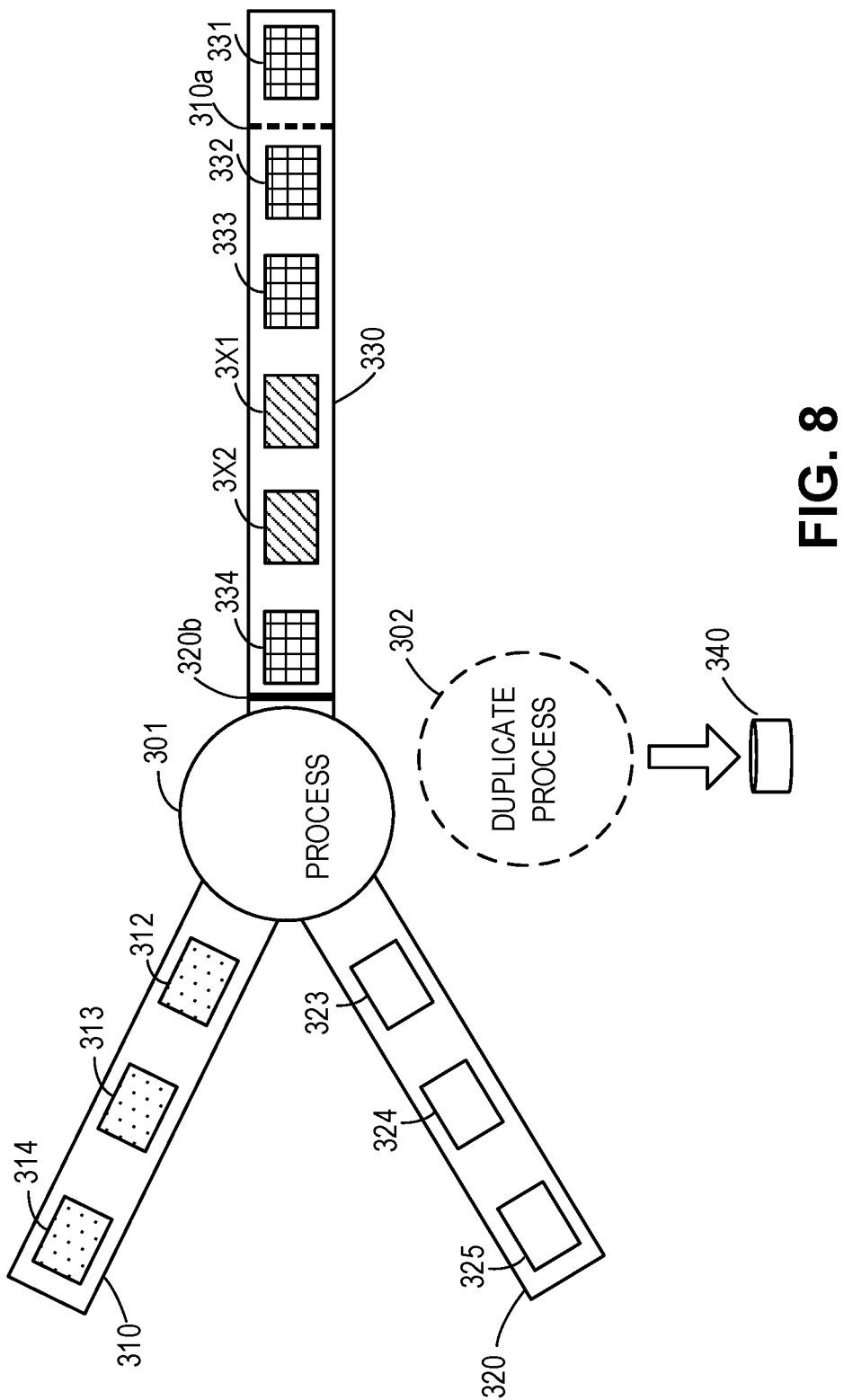
FIG. 8 shows a schematic view of creating a snapshot of a duplicate process in data stream processing according to an embodiment of the present disclosure.

For example, with reference to FIG. 8, a snapshot 340 of the duplicate process 302 is created. The duplicate process 302 only processes data units before the ending snapshot tag 320b in the second input data stream 320, but does not process data units after the starting trigger tag 310a in the first input data stream 310. Therefore, the snapshot 340 of the duplicate process 302, which is created after the ending snapshot tag 320b is received, may keep the semantics of the snapshot. Further, when performing failure recovery of the process 301 by using the snapshot 340 of the duplicate process 302, it can be ensured that any data unit in the data stream is processed exactly once, thereby avoiding a final wrong processing result.

Since both the process 301 and the duplicate process 302 process data units before the ending snapshot tag 320b in the second input data stream 320 and their respective output data units are generated, a source of an output data unit can be differentiated by setting a flag bit in the output data unit. For example, the process 301 may set flag bits in the generated data units 332, 333 and 334 to be a first state so as to indicate these output data units are generated by the process 301. Similarly, the duplicate process 302 may set flag bits in the generated data units 3X1 and 3X2 to be a second state different than the first state so as to indicate these output data units are generated by the duplicate process 302. Of course, it is also feasible to differentiate sources of output data units in other way, and the scope of the embodiments of the present disclosure is not limited in this regard.

In some embodiments, after the snapshot 340 of the duplicate process 302 is created, the duplicate process 302 may be deactivated, so as to be prevented from continuing consuming computing resources. In addition, it may be understood that after creating the snapshot 340 of the duplicate process 302, the process 301 will continue to process subsequent data units 312 to 314 in the first input data stream 310 and subsequent data units 323 to 325 in the second input data stream 320.

In some embodiments, after receiving the ending snapshot tag 320b, the process 301 may add the ending snapshot tag 320b to an output data stream destined to a subsequent process. Thus, the subsequent process may create a snapshot of its own duplicate process after receiving the ending snapshot tag 320b, which will to be described with reference to FIGS. 9 and 10 below.

As described above, the subsequent process of the process 301 may activate its own duplicate process after receiving a starting trigger tag in a data stream from the process 301 and create a snapshot of its own duplicate process after receiving an ending snapshot tag, which will be described with reference to FIGS. 9 and 10.

Figure 9:
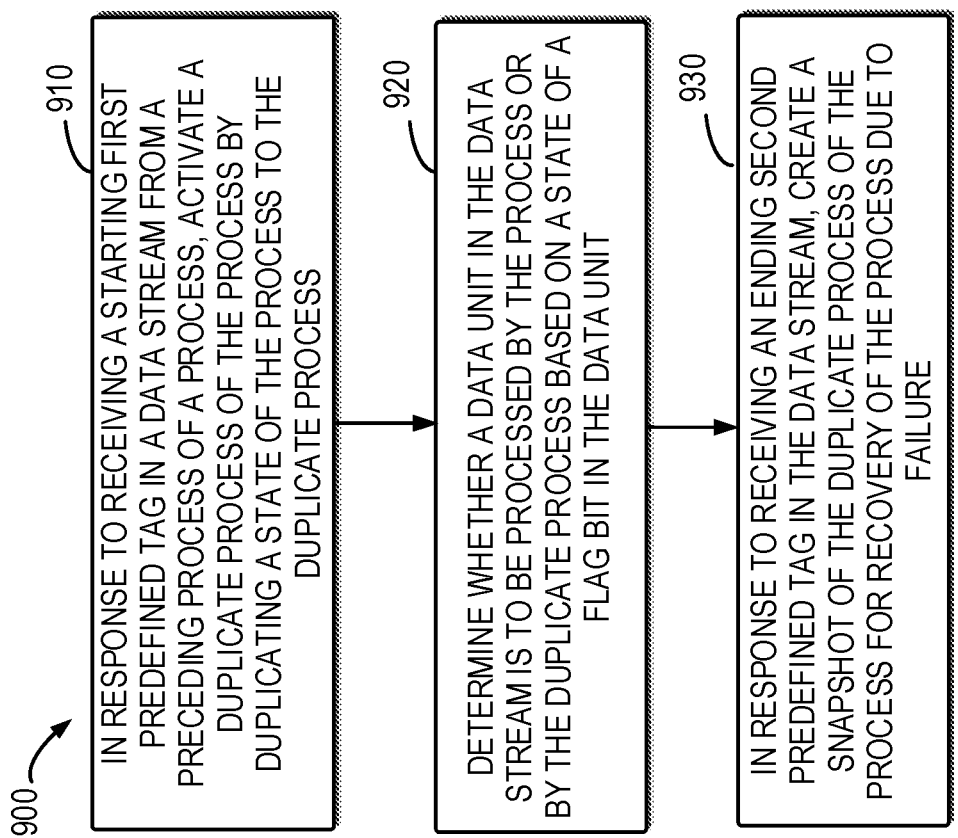
FIG. 9 shows a flowchart of a method of processing data streams according to an embodiment of the present disclosure.

FIG. 9 shows a flowchart of a method 900 of data stream processing according to other embodiment of the present disclosure. FIG. 10 shows a schematic view of data stream processing according to an embodiment of the present disclosure. In some embodiments, the method 900 may be implemented by the subsequent process of the process 301 in FIG. 3. It is to be understood that the method 900 may further comprise an additional step that is not shown and/or omit a step that has been shown, and the scope of the present disclosure is not limited in this regard. For the sake of discussion, the method 900 will be discussed in conjunction with FIG. 10.

At 910, after receiving a starting trigger tag in a data stream from a preceding procedure of a process, the process duplicates its own state to a duplicate process of the process so as to activate the duplicate process.

Figure 10:
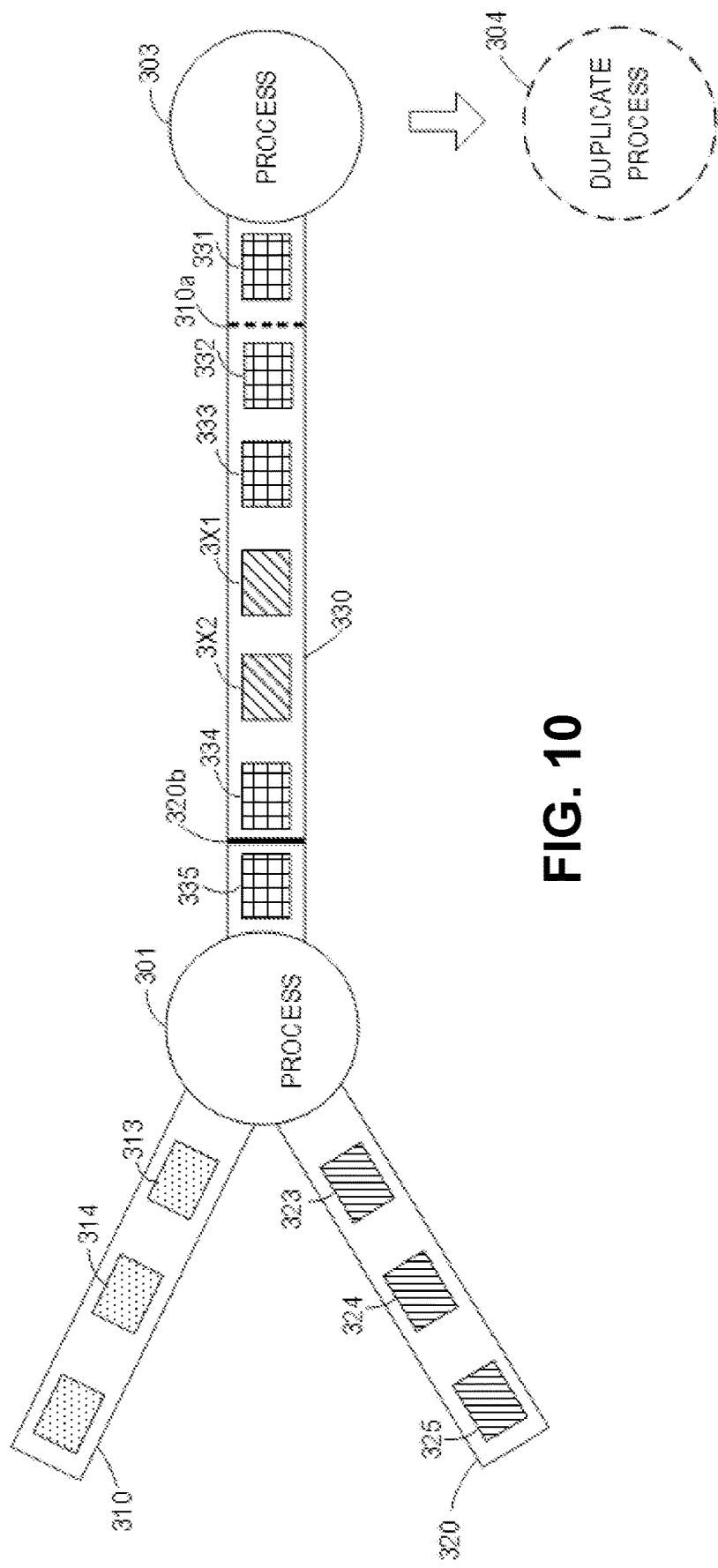
FIG. 10 shows a schematic view of data stream processing according to another embodiment of the present disclosure.

For example, with reference to FIG. 10, a process 303 receives a data stream 330 from its preceding procedure 301. The data stream 330 comprises an ordered sequence of data units 331 to 335, 3X1 and 3X2, a starting trigger tag 310a and an ending snapshot tag 320b. After receiving the starting trigger tag 310a, the process 303 duplicates its own state to a duplicate process 304 of the process 303 so as to activate the duplicate process 304.

In some embodiments, the process 303 may be executed on a computing device in a computing device cluster. In other embodiments, the process 303 may be executed in a cloud environment. Alternatively, or additionally, the process 303 may be implemented partially or completely based on hardware, e.g. implemented based on a field programmable gate array (FPGA). The scope of the present disclosure is not limited in this regard.

Still with reference to FIG. 9, at 920, the process determines whether a data unit is to be processed by the process or the duplicate process based on a state of a flag bit in the data unit in the data stream.

For example, in the example of FIG. 10, the process 303 determines whether the data units 331 to 335, 3X1 and 3X2 in the data stream 330 are to be processed by the process 303 or the duplicate process 304 based on states of flag bits of these data units. As described with reference to FIG. 8, the process 301 may set the flag bits in the generated data units 332, 333 and 334 to the first state so as to indicate these output data units are generated by the process 301. Similarly, the duplicate process 302 may set the flag bits in the generated data units 3X1 and 3X2 to the second state different than the first state, so as to indicate these data units are generated by the duplicate process 302. Therefore, if the first state of the flag bits of the data units 331 to 335 are detected, the process 303 may determine these data units are to be processed by itself. If the second state of the flag bits of the data units 3X1 and 3X2 are detected, the process 303 may determine these data units are to be processed by the duplicate process 304.

Returning to FIG. 9, at 930, after the ending snapshot tag in the data stream is received, a snapshot of the duplicate process of the process is created for failure recovery of the process. For example, in the example of FIG. 10, after the ending snapshot tag in the data stream 330 is received, a snapshot of the duplicate process 304 of the process 303 is created for failure recovery of the process 303.

In the embodiments of the present disclosure, the process 303 only processes output data units generated by its preceding procedure 301, and the duplicate process 304 only processes output data units generated by the duplicate process 302 of its preceding process 301. Therefore, the snapshot of the duplicate process 304, which is created after the ending snapshot tag 320b is received, may keep the semantics of the snapshot. Further, when performing failure recovery of the process 303 by using the snapshot of the duplicate process 304, it can be ensured that any data unit in the data stream is processed exactly once, thereby avoiding a final wrong processing result.

In some embodiments, after the snapshot of the duplicate process 304 is created, the duplicate process 304 may be deactivated, so as to be prevented from continuing consuming computing resources.

Figure 11:
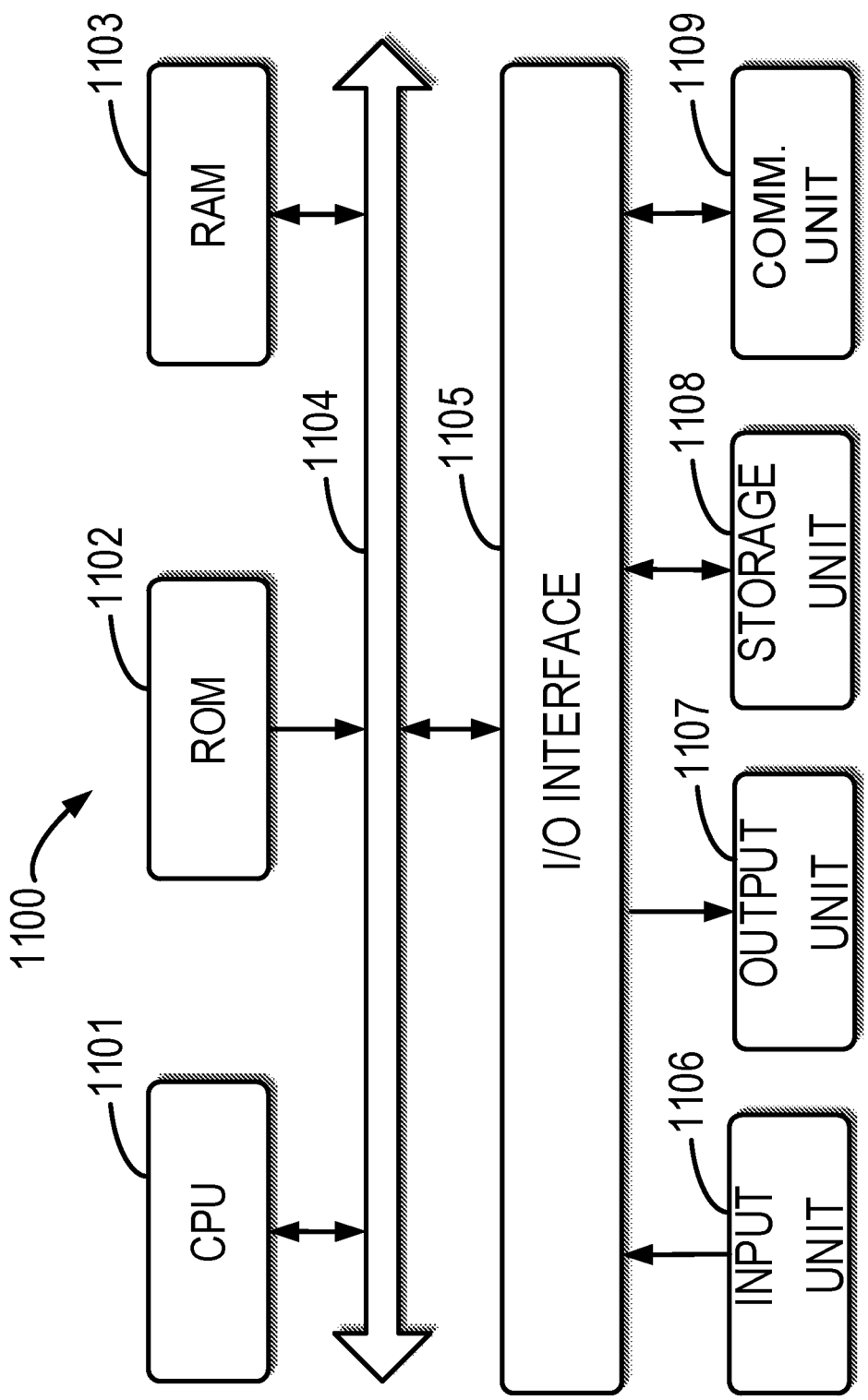
FIG. 11 shows a schematic block diagram of a device which is applicable to implement the embodiments of the present invention.

FIG. 11 schematically shows a block diagram of a device 1100 which is applicable to implement the embodiments of the present disclosure. As depicted, the device 1100 includes: CPU (Central Process Unit) 1101, which may execute various appropriate actions and treatment according to computer program instructions stored in ROM (Read Only Memory) 1102 or computer program instructions loaded from a memory unit 1108 to RAM (Random Access Memory) 1103. In the RAM 1103, there may be stored various programs and data needed by operations of the device 1100. The CPU 1101, ROM 1102 and RAM 1103 are coupled to one another via a bus 1104. An input/output (I/O) interface 1105 is also coupled to the bus 1104.

Multiple components in the device 1100 are coupled to the I/O interface 1105, including: an input unit 1106, such as a keyboard, a mouse, etc.; an output unit 1107, such as various types of displays and loudspeakers, etc.; a memory unit 1108, such as a magnetic disk, an optical disk, etc.; and a communication unit 1109, such as an Internet card, a modem, a wireless communication transceiver, etc. The communication unit 1109 allows the device 1100 to exchange information/data with other devices by means of a computer network such as the Internet and/or various telecommunication networks.

Various processes and treatment described above, for example, the methods 400 and 900, may be executed by the processing unit 1101. For example, in some embodiments, the methods 400 and 900 may be implemented as a computer software program, which is tangibly embodied on a machine readable medium such as the memory unit 1108. In some embodiments, part or all of the computer program may be loaded and/or installed to the device 1100 via the ROM 1102 and/or the communication unit 1109. The computer program, when loaded to the RAM 1103 and executed by the CPU 1101, may perform one or more steps of the methods 400 and 900 described above.

As used herein, the term "comprise" and its variants are to be read as open terms that mean "include, but is not limited to." The term "based on" is to be read as "based at least in part on." The term "one embodiment" and "the embodiment" are to be read as "at least one embodiment." The terms "first," "second" and the like are used to indicate different or the same objects. Other definitions, explicit and implicit, may be included below.

As used herein, the term "determine" covers various actions. For example, "determine" may comprise computing, calculating, process, deriving, investigating, lookup (e.g. lookup in a table, database or another data structure), ascertaining, etc. In addition, "determine" may comprise receiving (e.g. receiving information), accessing (e.g. accessing data in memory), etc. Furthermore, "determine" may comprise parsing, choosing, selecting, establishing, etc.

Note the embodiments of the present disclosure can be implemented in software, hardware or combination of software and hardware. The hardware portion can be implemented by using dedicated logic. The software portion can be stored in a memory and executed by an appropriate instruction executing system such as a microprocessor or specially-designed hardware. Those skilled in the art may appreciate the device and methods may be implemented using computer executable instructions and/or included in processor control code, which is provided on, for example, programmable memory or a data carrier such as an optical or electronic signal carrier.

Further, while operations of the methods of the present disclosure are depicted in a particular order in the accompanying drawings, this does not require or suggest that such operations be performed in the particular order or that all illustrated operations be performed to achieve desirable results. On the contrary, the steps depicted in the flowchart may be executed in a different order. Additionally, or alternatively, some steps may be omitted, a plurality of steps may be combined into one step, and/or one step may be decomposed into a plurality of steps. Further note that features and functions of two or more means according to the present disclosure may be embodied in one means. Conversely, features and functions of one means described above may be embodied in a plurality of means.

Although the present disclosure has been described with reference to several specific embodiments, it should be appreciated that the present disclosure is not limited to the disclosed specific embodiments. The present disclosure is intended to cover various modifications and equivalent arrangements included within the spirit and scope of the appended claims.

What is claimed is:

1. A method of processing data streams, comprising:
   in response to receiving a starting first predefined tag in a first input data stream from a first data source, activating a duplicate process of a process by duplicating a state of the process to the duplicate process;
   processing, by the duplicate process, only a data unit before an ending second predefined tag in a second input data stream from a second data source without interruption of processing of the first and second input data streams by the process, the second data source being different from the first data source; and
   in response to receiving the ending second predefined tag in the second input data stream, creating a snapshot of the duplicate process for recovery of the process due to failure.

2. The method according to claim 1, wherein the processing of the first and second input data streams by the process comprises:
   generating a first output data unit based on a data unit in the first input data stream and a data unit in the second input data stream, the first output data unit comprising a flag bit, the flag bit being set to a first state to indicate that the first output data unit is generated by the process.

3. The method according to claim 2, wherein processing, by the duplicate process, only the data unit before the ending second predefined tag comprises:
generating a second output data unit based on the data unit before the ending second predefined tag, the second output data unit comprising the flag bit, the flag bit being set to a second state to indicate that the second output data unit is generated by the duplicate process.

4. The method according to claim 3, further comprising:
adding in sequence the starting first predefined tag and the ending second predefined tag to an output data stream destined to a subsequent process of the process; and
adding the first and second output data units between the starting first predefined tag and the ending second predefined tag.

5. The method according to claim 1, further comprising:
deactivating the duplicate process after creating the snapshot.

6. A method of processing data streams, comprising:
in response to receiving a starting first predefined tag in a data stream from a preceding process of a process, activating a duplicate process of the process by duplicating a state of the process to the duplicate process;
determining whether a data unit in the data stream is to be processed by the process or by the duplicate process based on a state of a flag bit in the data unit; and
in response to receiving an ending second predefined tag in the data stream, creating a snapshot of the duplicate process of the process for recovery of the process due to failure.

7. The method according to claim 6, wherein determining whether the data unit in the data stream is to be processed by the process or by the duplicate process based on the state of the flag bit in the data unit comprises:
in response to detecting a first state of the flag bit, determining that the data unit is to be processed by the process, the first state indicating that the data unit is generated by the preceding process; and
in response to detecting a second state of the flag bit, determining that the data unit is to be processed by the duplicate process, the second state indicating that the data unit is generated by a duplicate process of the preceding process.

8. The method according to claim 6, further comprising:
deactivating the duplicate process after creating the snapshot.

9. An electronic device, comprising:
at least one processor; and
at least one memory comprising computer program instructions, the at least one memory and the computer program instructions being configured to, with the at least one processor, cause the device to perform steps comprising:
in response to receiving a starting first predefined tag in a first input data stream from a first data source, activating a duplicate process of a process by duplicating a state of the process to the duplicate process;
processing, by the duplicate process, only a data unit before an ending second predefined tag in a second input data stream from a second data source without interruption of processing of the first and second input data streams by the process, the second data source being different from the first data source; and
in response to receiving the ending second predefined tag in the second input data stream, creating a snapshot of the duplicate process for recovery of the process due to failure.

10. The electronic device according to claim 9, wherein the processing of the first and second input data streams by the process comprises:
generating a first output data unit based on a data unit in the first input data stream and a data unit in the second input data stream, the first output data unit comprising a flag bit, the flag bit being set to a first state to indicate that the first output data unit is generated by the process.

11. The electronic device according to claim 10, wherein processing, by the duplicate process, only the data unit before the ending second predefined tag comprises:
generating a second output data unit based on the data unit before the ending second predefined tag, the second output data unit comprising the flag bit, the flag bit being set to a second state to indicate that the second output data unit is generated by the duplicate process.

12. The electronic device according to claim 11, wherein the steps further comprise:
adding in sequence the starting first predefined tag and the ending second predefined tag to an output data stream destined to a subsequent process of the process; and
adding the first and second output data units between the starting first predefined tag and the ending second predefined tag.

13. The electronic device according to claim 9, wherein the steps further comprise:
deactivating the duplicate process after creating the snapshot.

14. The method according to claim 6, wherein the method is performed by an electronic device, comprising:
at least one processor; and
at least one memory comprising computer program instructions, the at least one memory and the computer program instructions being configured to, together with the at least one processor, cause the device to perform the method.

15. A computer program product being tangibly stored on a non-transitory computer readable medium and comprising machine executable instructions which, when executed, cause a machine to perform steps of the method according to claim 1.

16. A computer program product being tangibly stored on a non-transitory computer readable medium and comprising machine executable instructions which, when executed, cause a machine to perform steps of the method according to claim 6.

17. The method according to claim 1, wherein a given one of the starting first predefined tag and the ending second predefined tag comprises one of a trigger tag and a snapshot tag.

18. The method according to claim 6, wherein a given one of the starting first predefined tag and the ending second predefined tag comprises one of a trigger tag and a snapshot tag.

19. The electronic device according to claim 9, wherein a given one of the starting first predefined tag and the ending second predefined tag comprises one of a trigger tag and a snapshot tag.

20. The computer program product according to claim 15, wherein a given one of the starting first predefined tag and the ending second predefined tag comprises one of a trigger tag and a snapshot tag.

* * * * *